3,526,002
MAGNEBUOY
Ramond C. Waddel, Washington, D.C.
(4207 Yarnell Court, Bowie, Md. 20715)
Filed Mar. 31, 1960, Ser. No. 19,127
Int. Cl. G01c 19/30; G01r 33/02
U.S. Cl. 340—4                                    2 Claims

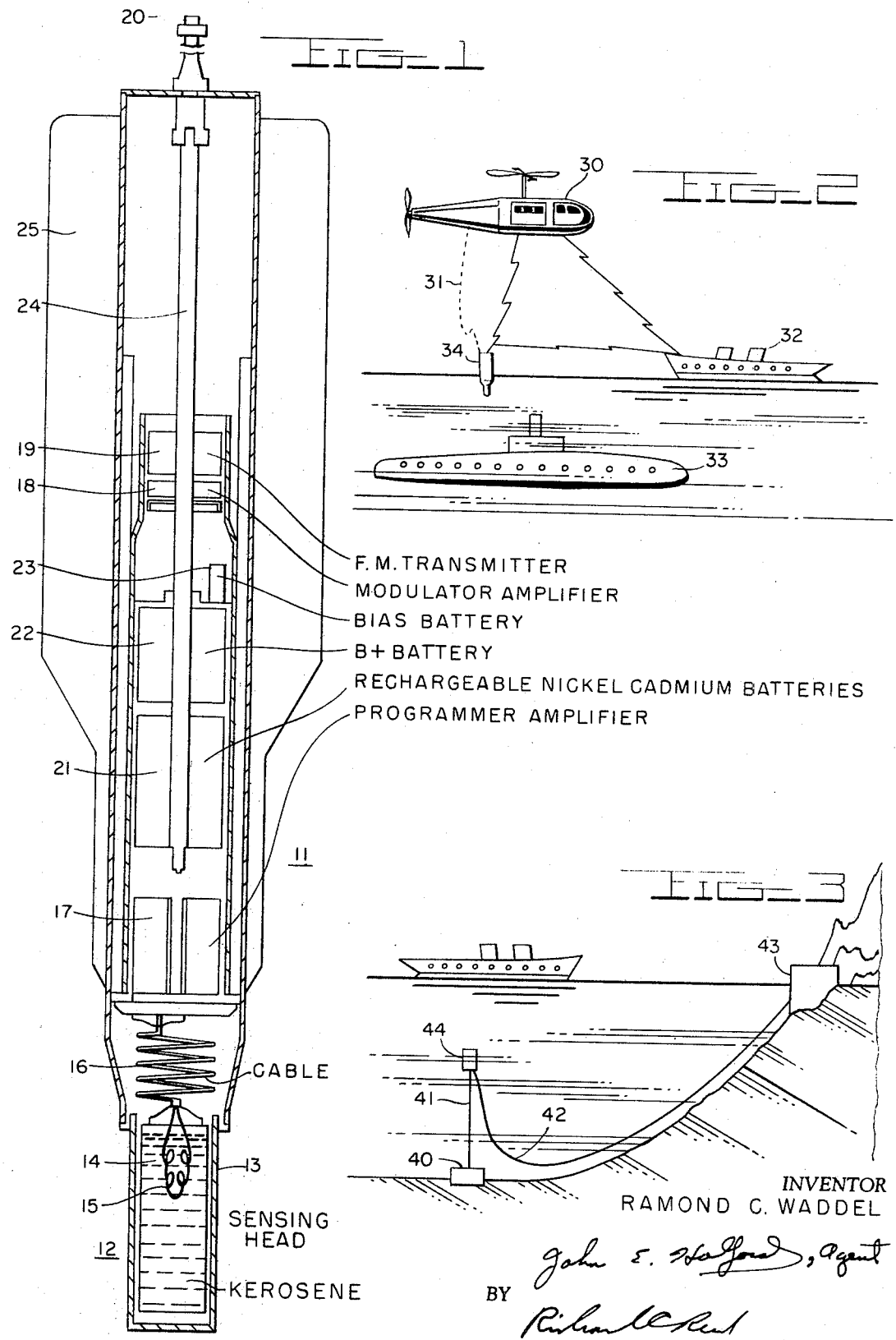

ABSTRACT OF THE DISCLOSURE

A submarine detector including a free precession magnetometer in a watertight buoyant housing. External radiation from the sensing coil is suppressed by a second coil energized in antiphase relationship to the sensing coil, and detected signals are transmitted by cable or radio waves to a remote station.

---

The invention described herein may be manufactured and used by or for the Government of the United States of America for government purposes without the payment of any royalties thereon or therefor.

The present invention relates to a magnetometer submarine detection device and more particularly to a detection device of this type in the form of a buoy.

Attempts have been made in the past to detect and classify submarine objects by the effect they produce on applied magnetic fields, in particular the ambient field of the earth. The changes produced by a ship or a mine, for example, in the earth's field are very small and only the most sensitive magnetometers can detect them.

The usual sensing device employed for this purpose uses three mutually perpendicular windings which must be very accurately oriented with respect to the earth's field. This requires a considerable amount of equipment and power and, therefore, is poorly adapted for air-dropped or unmanned marker buoys. Such equipment was generally towed through the air or water by an airplane or surface vessel.

Another system employs a large coil on the ocean floor, for example, to guard a harbor entrance. In addition to being a very expensive installation, it is also limited to areas which have a suitable terrain. Underwater currents and tides frequently displace such coils causing damage or false readings.

An object of the present invention is, therefore, to provide a magnetic detection device for submerged objects which is extremely sensitive, simple to operate and does not require special handling or tedious calibration.

A further object of the invention is to provide an unmanned buoy equipped with a sensitive magnetometer.

These and other objects of the invention are best understood with reference to the accompanying drawings wherein:

FIG. 1 shows a cutaway view of the magnetometer and buoy combination or magnebouy according to the invention;

FIG. 2 shows the magnebuoy employed in an air-drop system;

FIG. 3 shows the magnebuoy in a coastal defense or similar system; and

FIG. 4 shows an enlarged cutaway view of the sensing head.

As shown in FIG. 1 the detecting device or magnebuoy of the present invention consists of a buoyant housing 11 to which the remaining elements are attached. Fins 25 are provided to stabilize the buoy when it is dropped freely from aircraft. The sensing head 12 is attached to the nose of the housing and consists of a nonmagnetic container 13 filled with kerosene 14 or other suitable gyromagnetic material. Surrounding this container are the sensing coils 15. The sensing head is connected through a coiled cable 16 to the programming amplifier 17. The sensing head and programming amplifier are standard commercial items manufactured by Varian Associates, San Carlos, Calif.

The sensing head and programming amplifier consistute a free nuclear precession magnetometer. Magnetometers based on nuclear precession have been known for some time. As originally conceived a steady field to be measured was applied to a suitable material exhibiting known gyromagnetic properties. An alternating field was then applied at right angles to the steady field and the frequency of alternation varied to produce resonance. Resonance was detected by a coil having a magnetic axis perpendicular to both the steady and alternating field. This method was effective only to a minimum of approximately ten (10) gauss. The earth's field in the middle latitudes is approximately one-half (0.5) gauss.

The free nuclear precession magnetometer uses a strong polarizing field generated by a coil wound about an axis roughly normal to that of the earth to prealign the protons in the gyromagnetic material. The polarizing field is then removed after a second or less by interrupting the current flow in the polarizing coil. The earth's field, which is negligible in the presence of the polarizing field, then acts on the oriented protons causing them to precess. The precessing protons generate alternating fluxes which are detected by the sensing coils 15. The polarizing and sensing coils may be separate units, however, it has been customary in prior art devices of this type to use a single coil, as shown in the drawings, on a time sharing basis. the precession frequency of the flux is directly proportional to strength of the earth's field and the amplitude of the flux is directly proportional to the strength of the polarizing field.

Power for the various units is suplied from batteries 21, 22 and 23.

While the particular free precession magnetometer described above has been preferred for use in the structure of the invention, new types are being developed which have similar properties. For example, an optical pumping system using rubidium vapor is presently under development. It is, therefore, intended that the invention cover all such magnetometers which have sufficient sensitivity, compactness and simplicity that they may be efficiently employed in unmanned buoys. A presently known form of free precession nuclear magnetometer and programmer amplifier is described by G. S. Waters and P. D. Francis in an article entitled "Nuclear Magnetometer" which appears in The Journal of Scientific Instruments, vol. 35, No. 3, published March 1958, pp. 88–93.

The signals generated by the precessing protons are amplified in the programmer amplifier 17 and applied as a modulating signal to the modulator amplifier 18. The frequency modulated signal is then applied to an FM transmitter 19 for radiation from the antenna 20 mounted on the upper end of the buoy.

FIG. 2 shows a typical mobile system in which such a buoy 34 may be employed. In such cases it will be desirable to transport the buoy from one point to another, as for example when directing an attack on an underwater vessel. For greater flexibility the buoy may be attached to a helicopter 30 or similar craft by means of a cable. The unit can then be quickly dunked in the vicinity of submarine 33 of other target. The transmitter in such an arrangement may be placed in the helicopter and electrically wired to the buoy through the cable. Alternately the buoy may broadcast directly to a support vessel 32 for processing, or it may be processed and relayed through the helicopter. Where the water depth permits the buoy may be anchored to bottom.

FIG. 3 shows another embodiment of an anchored buoy 44 used as a shoreline or harbor defense measure. The buoy is totally submerged for secrecy by means of an anchor 40 and attaching cable 41 and to provide more uniform coverage with depth. A waterproof cable 42 of conventional design connects the buoy with a shore processing station 43. One station may be coupled to numerous buoys and correlate the information from each.

Since the fixed buoy is more vulnerable to attack by unfriendly vessels than the portable type in FIG. 2, it may be desired to prevent external radiations from the sensing coil. One means to do this, without disturbing the field to be measured, is to provide an external coil of much greater diameter surrouding the first. Such a coil 26 is shown in the enlarged view of the sensing head in FIG. 4. The external coil is energized to provide a field of opposite polarity to the first and of sufficient strength to cancel the leakage flux outside of the sensing head.

Obviously many modifications and variations of the present invention are possible in the light of the above teachings. It is, therefore, to be understood that within the scope of the appended claims the invention may be practiced otherwise than as specifically described.

What is claimed is:

1. A magnebuoy for detecting submerged metal objects in a fluid medium, comprising:
   a closed watertight buoyant housing containing a free precession magnetometer, a power supply and radio relay means for transmitting information from said magnetometer to a remote receiving station;
   said housing, magnetometer, power supply and relay means having a total density less than sea water;
   said magnetometer including a container of gyromagnetic material and first and second coils;
   said coils being energized in antiphase relationship by said power supply;
   said first coil being wound about said container and polarizing said gyromagnetic material as said first coil is energized by said power supply;
   said second coil being of much greater diameter than and surrounding said first coil so that the energization thereof in antiphase relationship to said first coil suppresses the radiation caused by the polarization of said gyromagnetic material beyond the confines of said housing, thereby securing said magnebuoy from enemy detection while the greater diameter of said second coil prevents suppression of the polarization of said gyromagnetic material.

2. A magnebuoy for detecting submerged metal objects in a fluid medium, comprising:
   a closed watertight buoyant housing containing a free precession magnetometer, a power supply and radio relay means for transmitting information from said magnetometer to a remote receiving station;
   said housing, magnetometer, power supply and relay means having a total density less than sea water;
   said free precession magnetometer including a container of gyromagnetic material;
   polarizing means energized by said power supply for magnetically polarizing said gyromagnetic material;
   means for suppressing the magnetic radiation of said polarizing means beyond the confines of said housing;
   said radiation suppressing means being energized by said power supply in phase opposition to the energization of said polarizing means.

References Cited

UNITED STATES PATENTS

| | | | |
|---|---|---|---|
| 948,424 | 2/1910 | Long | 340—2 |
| 1,150,799 | 4/1915 | Wood | 340—4 |
| 1,353,410 | 9/1920 | Marshall | 340—2 |
| 2,448,713 | 9/1948 | Hansell | 340—2 |
| 2,586,799 | 6/1948 | Elarde | 340—197 |
| 2,629,083 | 2/1953 | Mason et al. | 340—2 |
| 2,632,884 | 3/1953 | Murphy | 340—197 |
| 2,838,741 | 6/1958 | Mason | 340—2 |
| 2,856,579 | 10/1958 | Packard | 324—43 |
| 1,127,155 | 12/1956 | France | 324—.5 |
| 2,397,137 | 3/1946 | Glennon et al. | 340—4 |
| 2,861,242 | 11/1958 | Leavitt | 324—43 |
| 2,905,915 | 9/1959 | Harris | 336—181 |
| 3,004,211 | 10/1961 | Anderson et al. | 324—.5 |
| 3,022,462 | 2/1962 | Keipert | 340—2 |
| 3,030,571 | 4/1962 | Dessler | 324—.5 |
| 3,042,855 | 7/1962 | Brown | 324—.5 |
| 3,058,053 | 10/1962 | Bloom | 324—.5 |

OTHER REFERENCES

"Magnetic Prospecting," Bell Laboratories Record by W. J. Shackelton, April 1947 (142–145 relied on).

"A Rocket-Borne Magnetometer," by K. Burrows, The Journal of the British IRE, vol. 19, No. 12, December 1959, pp. 769–776 relied on.

RICHARD A. FARLEY, Primary Examiner

U.S. Cl. X.R.

324—43